L. SCHWITZER.
MEANS FOR LUBRICATING BEARINGS.
APPLICATION FILED MAR. 22, 1920.
1,364,647.
Patented Jan. 4, 1921.
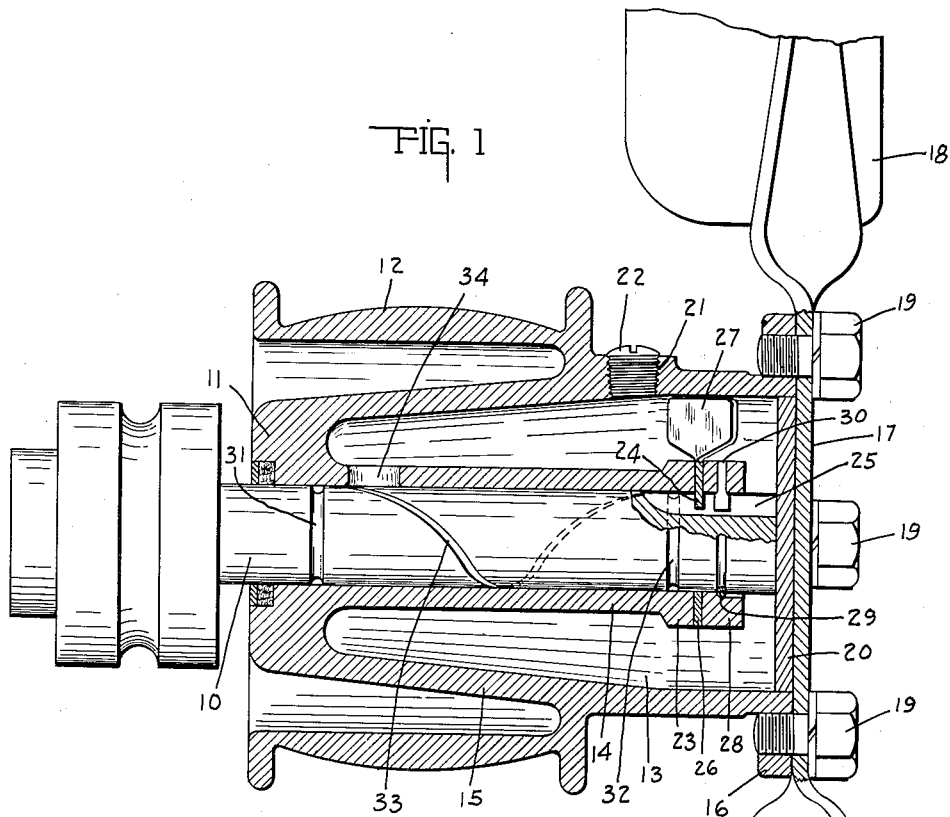
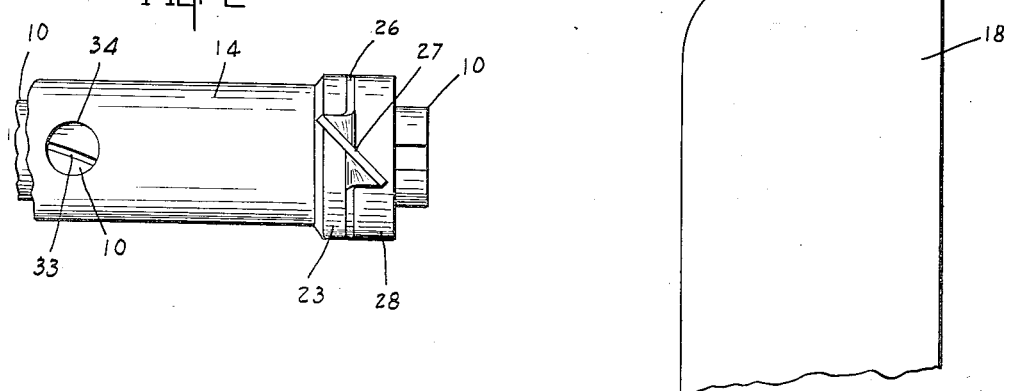
INVENTOR.
LOUIS SCHWITZER
BY
*Lockwood & Lockwood*
ATTORNEYS

UNITED STATES PATENT OFFICE.

LOUIS SCHWITZER, OF INDIANAPOLIS, INDIANA.

MEANS FOR LUBRICATING BEARINGS.

1,364,647.　　　　Specification of Letters Patent.　　Patented Jan. 4, 1921.

Application filed March 22, 1920. Serial No. 367,697.

*To all whom it may concern:*

Be it known that I, LOUIS SCHWITZER, a subject of the Republic of Czecho-Slovakia, and a resident of Indianapolis, county of Marion, and State of Indiana, have invented a certain new and useful Means for Lubricating Bearings; and I do hereby declare that the following is a full, clear, and exact description thereof, reference being had to the accompanying drawings, in which like numerals refer to like parts.

This invention relates to a fan construction, and more particularly to the lubricating means as applied to the hub revolving upon the stationary spindle.

The main feature of the invention consists in constructing a lubricating reservoir within a solid hub and providing a flinger, baffle plate or deflector within said reservoir which will help distribute the lubricant to the bearing surfaces of the spindle and the hub.

Another feature of the invention is the construction of the lubricating reservoir in such a manner that the lubricant will substantially complete a cycle within said chamber and be positively assisted in said cycle by the deflecting means positioned within the chamber.

The full nature of the invention will be understood from the accompanying drawings and the following description and claims.

In the drawings, Figure 1 is a longitudinal cross sectional view of the improved reservoir and lubricating means. Fig. 2 is a plan view of the hub bearing, deflecting means and the communication between the bearing and the spindle.

In the drawings there is shown a spindle 10 suitably supported, and in the present instance the spindle is stationarily secured. Upon the same is rotatably mounted a fan hub 11 which is provided with a belt pulley 12 herein shown integral with the fan hub. The pulley, however, may be otherwise secured to the hub 11 in any suitable manner. The hub 11 is herein shown provided with an annular lubricating chamber or reservoir 13, the inner wall of which constitutes the spindle bearing 14 and the outer wall 15 constitutes the support for the belt pulley and the fan revolved thereby. Upon one end of the separating outer wall 15 is an outwardly extending circular flange 16 suitably supporting a fan plate or spider member 17 to which the fan blades 18 are suitably secured. In the present instance the plate or spider 17 is rigidly secured to the circular flange 16 by means of the bolts 19. Adjacent the plate or spider 17 and within the cylindrical wall 15 is a closure member or thrust plate 20 in engagement with the inner surface thereof to close the reservoir 13. In any convenient portion of the outer wall 15 is formed a supply port 21 closed by a suitable plug 22, as shown.

The inner wall or bearing portion 14 of the hub 11 terminates short of the outer wall 15 thereof and the spindle 10. The terminating end of the bearing 14 is provided with an outwardly extending tapered circular flange 23. Adjacent the circular flange 23 and stationarily secured to the spindle 10 by means of a locking tooth 24 seatable in a longitudinal recess 25 in said spindle is a supporting ring member 26 provided with a flinger or deflecting plate 27. As shown clearly in Fig. 2, the projecting portion 27 of the ring 26 is positioned angularly with respect to the longitudinal axis of the spindle and also to a plane, including the ring extending transversely of the spindle.

The means for securing the hub 11 against longitudinal movement upon the spindle 10 and also for securing the ring 26 comprises a locking nut 28 coöperating with a locking ring 29 and a suitable key 30 for securing said nut non-rotatably upon the spindle 10, as well as securing the same against longitudinal movement thereof.

In the present instance the spindle 10 is suitably and circularly channeled near the ends of the bearing 14, as indicated by the numerals 31 and 32. The spindle is also suitably channeled to provide a spiral or helical groove 33, said groove communicating with the circular channels 31 and 32. The bearing wall 14 is provided with a lubricant receiving port or opening 34 near the end thereof opposite from the projection 27. The groove 32 communicates with the groove or slot 25 to relieve the pressure of the lubricant supplied to the bearings. There is shown but one opening 34 for supplying lubricant to the bearing, but it will be understood that a plurality of said openings may be provided if desired.

The lubricating cycle is as follows: The hub 11 is rotated upon the spindle 10 by means of power supplied through the pulley 12. Lubricant, preferably in the form of a fluid, is supplied to the reservoir 13 through the opening 21 in the usual manner. When the reservoir, fan and pulley rotate upon the spindle 10, lubricant will be carried upwardly by the outer wall 15. Since the wall 15 is tapered outwardly, as shown, the lubricant collects near the end thereof adjacent the flinger or deflecting plate 27. Lubricant, thus carried upwardly and around with the wall 15, is engaged by the deflecting plate 27 and is flung or thrown to the far end of the reservoir 13. The lubricant which is flung is received directly by the opening or port 34. Lubricant is thus supplied to the spindle 10 through the opening 34 and is conveyed to all parts thereof by means of the groove 33 in said spindle and by means of the rotational movement of the opening 34 with the hub structure. The lubricant supplied to the spindle 10 is conveyed by said groove 33 to the channel 32 and discharges into the slot 25 from which it drops into the lower portion of the reservoir 13 adjacent the flinging end thereof.

The invention has been described in detail, but it will be understood that the same represents the preferred form of construction embodying the invention, and that many modifications thereof are possible without departing from the broader features of the invention.

The invention claimed is:

1. A fan structure comprising a hub member, a stationary spindle upon which said hub is revolubly mounted, said hub having an annular lubricating chamber formed therein, the inner wall of said chamber forming the bearing for said spindle, said inner wall having a port opening therein to provide access to the spindle, and a deflecting member within said chamber to engage and transmit lubricating material contained within said chamber to the surface of said spindle through said port opening for lubricating the bearing surface thereof.

2. A fan structure comprising a hub member, a stationary spindle upon which said hub is revolubly mounted, said hub having an annular lubricating chamber formed therein, the inner wall of said chamber forming the bearing for said spindle, said inner wall having at one end a port opening to provide access to the spindle, and a deflecting member near the other end of said chamber to engage and transmit lubricating material to the surface of said spindle through said port opening for lubricating the bearing surfaces thereof.

3. A fan structure comprising a hub member, a stationary spindle upon which said hub is revolubly mounted, said hub having an annular lubricating chamber formed therein, the outer wall of said chamber being tapered inwardly toward the inner wall thereof, said inner wall forming a bearing for said spindle, said inner wall having a port opening formed therein near the end adjacent the inner end of the outer tapering wall for providing access to the bearing, and a deflecting member to engage and transmit lubricating material contained within said chamber to the surface of said spindle through said port opening for lubricating the bearing surface thereof.

4. A lubricating system for hubs and the like, including a hub, a spindle therefor upon which the hub is mounted, said hub having an annular chamber therein, the inner wall thereof forming the bearing for said spindle, said inner wall terminating short of said spindle, and a deflecting member secured to said spindle for engaging the lubricating material contained within the chamber and causing the same to be carried to said spindle for lubricating the bearing surface thereof, said inner wall being provided with a port opening to provide access to said spindle through which said lubricant is supplied.

5. A lubricating system for hubs and the like, including a hub, a spindle upon which the hub is mounted, said spindle being suitably grooved, said hub having an annular chamber formed therein, the inner wall thereof forming the bearing for said spindle, said inner wall having an opening therein providing access to said spindle for supplying lubricant thereto, said spindle being provided with means communicating with said groove to receive the lubricant discharged therefrom, and means for causing lubricant to pass from the chamber to the opening in said inner wall to supply lubricant to the bearing for lubricating the bearing surfaces thereof.

In witness whereof, I have hereunto affixed my signature.

LOUIS SCHWITZER.